(12) United States Patent
Belford

(10) Patent No.: US 8,038,082 B2
(45) Date of Patent: Oct. 18, 2011

(54) IRRIGATION EMITTER STAKE

(75) Inventor: Lorne-Moshe Belford, D. N. Hefer (IL)

(73) Assignee: Netafim Ltd., Tel Aviv (IL)

(*) Notice: Subject to any disclaimer, the term of this patent is extended or adjusted under 35 U.S.C. 154(b) by 430 days.

(21) Appl. No.: 12/084,893

(22) PCT Filed: Nov. 13, 2006

(86) PCT No.: PCT/IL2006/001300
§ 371 (c)(1),
(2), (4) Date: May 13, 2008

(87) PCT Pub. No.: WO2007/054943
PCT Pub. Date: May 18, 2007

(65) Prior Publication Data
US 2009/0236490 A1    Sep. 24, 2009

(30) Foreign Application Priority Data
Nov. 14, 2005   (FR) .................... 05 11529

(51) Int. Cl.
*B05B 15/06*    (2006.01)
(52) U.S. Cl. .......... 239/273; 239/276; 248/508
(58) Field of Classification Search ........... 248/508, 248/507, 156, 87, 530; 239/273, 276, 279, 239/280; 138/106
See application file for complete search history.

(56) References Cited

U.S. PATENT DOCUMENTS

| | | | | |
|---|---|---|---|---|
| 2,084,817 A | * | 6/1937 | Lombard | 239/258 |
| 2,425,893 A | * | 8/1947 | Molitor | 248/87 |
| 2,536,341 A | * | 1/1951 | Asher | 248/87 |
| 2,852,307 A | * | 9/1958 | Clark | 239/276 |
| 3,804,334 A | | 4/1974 | Curry | |
| 3,941,342 A | * | 3/1976 | Bradshaw | 248/88 |
| 3,994,441 A | * | 11/1976 | Testa | 239/276 |
| 4,753,394 A | | 6/1988 | Goodman | |
| 4,944,476 A | * | 7/1990 | Olson | 248/87 |
| D334,333 S | * | 3/1993 | Christen et al. | D8/356 |
| 5,435,490 A | | 7/1995 | Machut | |
| 7,097,117 B2 | * | 8/2006 | Zur et al. | 239/276 |

(Continued)

FOREIGN PATENT DOCUMENTS
EP    1 201 118    5/2002
(Continued)

OTHER PUBLICATIONS

Search Report of Taiwanese Patent Application No. 095142102; dated Apr. 13, 2010.

*Primary Examiner* — A. Joseph Wujciak, III
(74) *Attorney, Agent, or Firm* — The Nath Law Group; Susanne M. Hopkins; William L. Klima

(57) ABSTRACT

A stake for holding an irrigation pipe near a plant. The pipe comprising a first end portion and a second portion bendable relative to the first end portion. The stake comprising a distal retaining portion for holding the first portion of the pipe and first and second proximal retaining portions for optionally accommodating the second portion of the pipe. The stake is designed to allow the second portion of the pipe to be optionally moved from the first proximal retaining portion to the second proximal retaining portion without removing the first portion of the pipe from the distal retaining portion.

15 Claims, 2 Drawing Sheets

U.S. PATENT DOCUMENTS

| | | | |
|---|---|---|---|
| D589,336 S * | 3/2009 | Cosimo | D8/388 |
| 2001/0028021 A1 * | 10/2001 | Martin | 248/87 |
| 2005/0077396 A1 | 4/2005 | Rabinowitz | |
| 2008/0017763 A1 * | 1/2008 | Hatch et al. | 248/87 |

FOREIGN PATENT DOCUMENTS

| | | |
|---|---|---|
| EP | 1 391 150 | 2/2004 |
| TW | 414007 Y | 12/2000 |
| TW | 424412 Y | 3/2001 |

* cited by examiner

IRRIGATION EMITTER STAKE

FIELD OF THE INVENTION

This invention relates to means for fixing an irrigation pipe to the ground beside a plant.

BACKGROUND OF THE INVENTION

With many kinds of irrigation emitters, there is a need to fix the irrigation pipe close to the irrigated plant, to the cultivation substrate (soil) or to the pot with the plant. A few examples of devices with such function are presented in the U.S. application Ser. No. 10/644,086, including a stake with a clamp holding the pipe perpendicular to the stake axis, a stake with an internal channel exiting under the soil surface

SUMMARY OF THE INVENTION

In accordance with one aspect of the present invention, there is provided a stake for holding a pipe, which may be elastic, near a plant. Said pipe having a first end portion and a second portion bendable relative to the first end portion; the stake having at one end thereof a tip adapted for being driven into the soil, and at the other a head for retaining said pipe, the head comprising a distal retaining portion for holding the first portion of the pipe, a first proximal retaining portion adapted for accommodating the second portion of the pipe in a first position coaxial with the first portion of the pipe when held in the distal retaining portion, and a second proximal retaining portion adapted for optionally accommodating the second portion of the pipe in its second position in which the pipe is bent, the first and second proximal retaining portions meeting at a transition region such that the change between the first and second position of the second portion of the pipe relative to the first portion of the pipe is achievable without removing said first portion from the distal retaining portion.

Said stake may be formed such that said pipe is bendable at an area of merger between the first and second portions thereof, said first and second proximal retaining positions meet at a transitional region and said transition region is so formed as to smoothly accommodate the pipe at said area of merger, when the pipe is in its second position.

Said stake may include a distal retaining portion includes inward protruding elements adapted to tightly retain said first portion of the pipe.

Said stake may be formed such that the first and second proximal retaining portions are in the form of respective first and second proximal recesses extending along respective first and second axes oriented relative to each other at an angle corresponding to that between the first and second positions of the second portion of the pipe. The axes of said stake may lie in one plane.

Said stake recesses may have sides open in one direction perpendicular to each of said axes. The stake may have an elongated shape and a main axis, and said distal retaining portion and first proximal recess are portions of one elongated recess extending along said main axis. The stake may be formed with said second proximal recess has an element overhanging the open side thereof, such that said second portion of the pipe may be inserted into said second proximal recess under said overhanging element or removed from said second proximal recess only by elastic bending of said pipe at said area of merger, the bending being achievable without removing said first end portion of pipe from said distal retaining portion of the stake. This angle may be in the range of 30-120°.

Said stake may have a channel with an inlet adapted to receive water from said pipe and an outlet facing said tip.

The stake having at least one additional proximal retaining portion similar to said second proximal retaining portion, providing holding said second portion of the pipe in said stake at a position different from said first and second positions thereof relative to the first portion of the pipe when held in the distal retaining portion.

The stake may be an integral body free of movable parts and may be made of polymer material.

The stake may be capable of preassembly with said pipe for packaging with the second portion of the pipe being in said first position.

In accordance with another aspect of the present invention there is provided a stake assembly comprising a stake having any of the features described above and a pipe comprising a first end portion and a second portion bendable relative to the first end portion, with the first end portion of the pipe being held by the distal retaining portion of the stake and the second portion of the pipe being movable between the first and second positions thereof.

In accordance with yet another aspect of the present invention there is provided a package including the stake assembly as described in the previous aspect, with the second portion of the pipe being in its first position.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Figure 1:
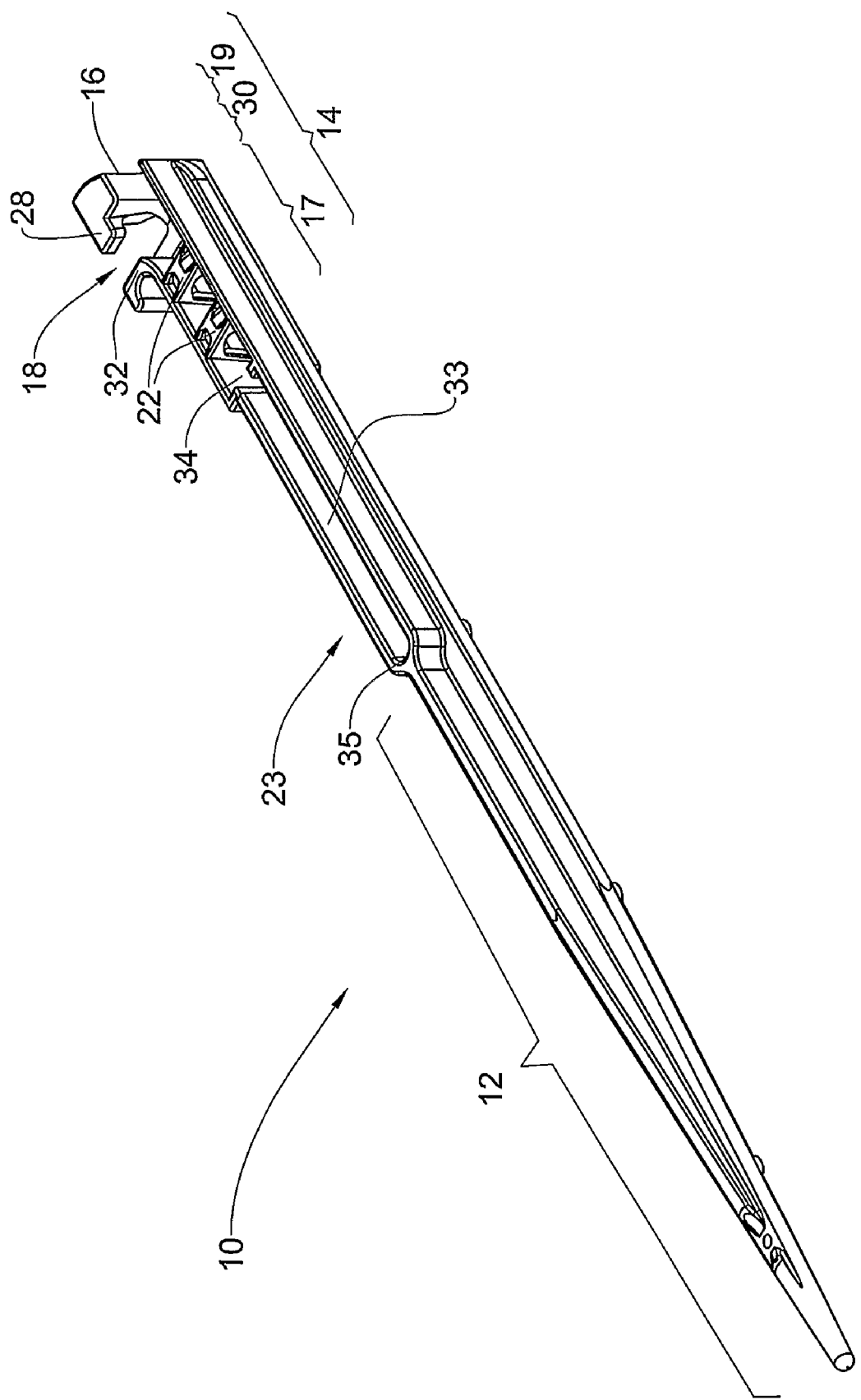
FIG. 1 is a perspective view of a stake in accordance with one embodiment of the present invention.
Figure 2A:
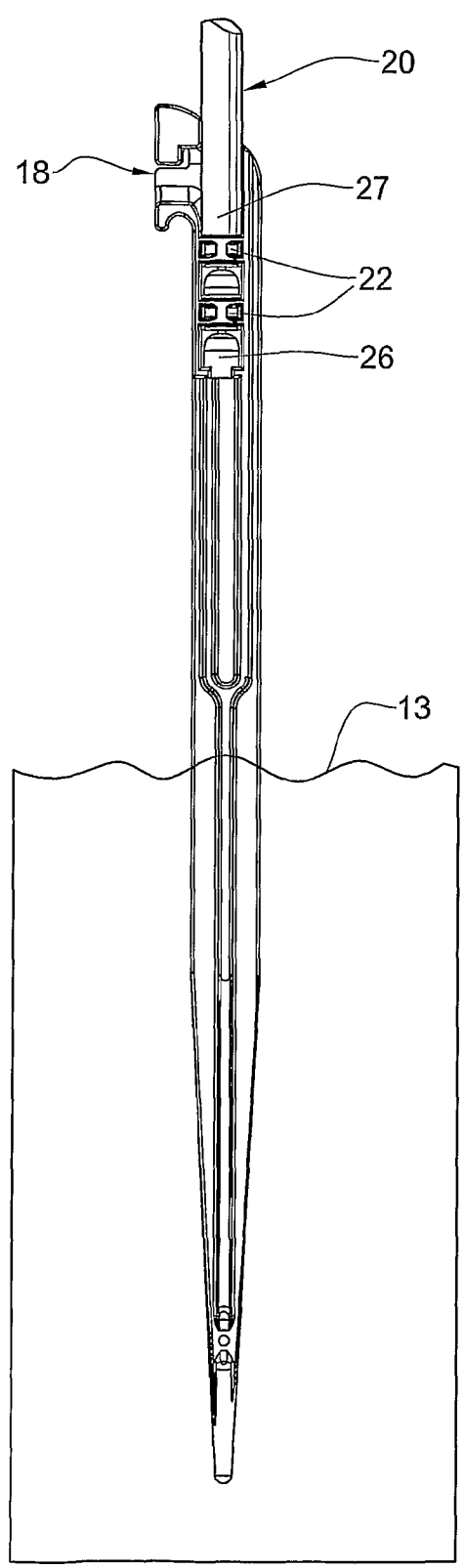
FIGS. 2A and 2B show two possible ways of retaining an irrigation pipe in the stake of FIG. 1.
Figure 2B:
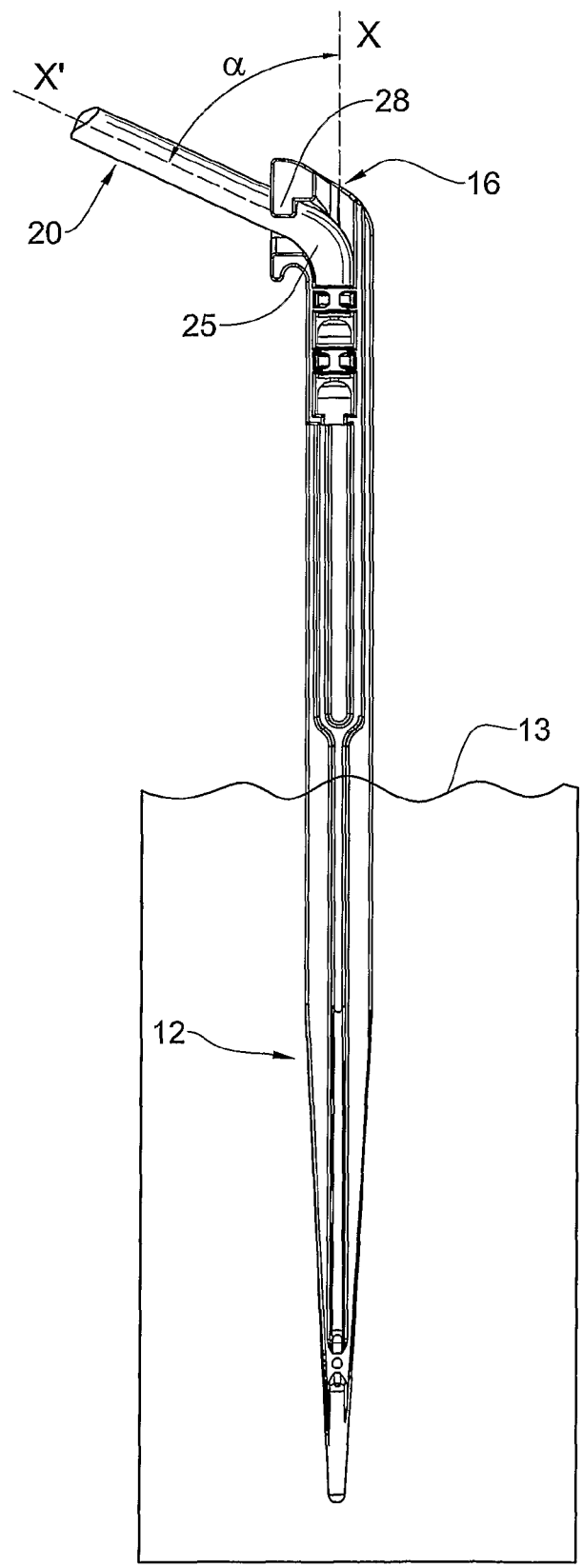

With reference to FIGS. 1 to 2B, there is shown a stake 10 in accordance with one embodiment of the present invention. The stake 10, which is rigid, has an elongated tip 12 extending along a longitudinal axis X, which is driven into soil 13, and a head 14 for retaining an irrigation pipe 20 (see also FIGS. 2A and 2B). The irrigation pipe 20 has a first end portion 26 and a second portion 27 adjacent the first end portion 26, and is elastic. The second portion 27 is bendable relative to the first end portion 26 at an area 25 of their merger.

The head 14 is formed with an elongated axial recess 16 having a distal retaining portion in the form of a distal recess portion 17 adapted to axially receive the first, end portion 26 of the pipe and a proximal retaining portion in the form of a proximal recess portion 19 adapted to receive the second portion 27 of the pipe including its merger area 25, in a position coaxial with the first portion of the pipe. The distal recess portion 17 has several bridges 22 closing its open side 23 so that the first end portion 26 of the pipe may be inserted in the distal recess portion 17 only axially. The bridges 22 protrude inwardly into the distal recess portion 17 to such an extent as to retain the end portion 26 of the pipe when it is pushed, via the proximal recess portion 19 into the distal recess portion 17.

The head 14 is further formed with a lateral recess 18 extending along an axis X' at an angle α to the axis X, and meeting with the proximal recess portion 19 of the axial recess 16, at a transition region 30.

The proximal recess portion 19 and the lateral recess 18 are open in the same direction so as to allow the displacement of the second portion 27 of the pipe from the proximal recess portion 19, after having bent the pipe at the merger area 25 thereof, into the lateral recess 18, with the first portion of the pipe 26 being retained in the distal recess portion 17. The transition region 30 between the proximal recess portion 19 and lateral recess 18 is formed with a rounded wall 32 to smoothly accommodate the merger area 25 of the pipe when the second portion 27 thereof is inserted in the lateral recess 18.

The lateral recess 18 has an open side with an overhanging element 28 partially obscuring the open side, to keep the second portion 27 of the pipe in place when inserted in the lateral recess 18.

The stake is formed with a channel 33 abutting the distal recess 17, with an inlet 34 adapted to receive water from the first end portion 26 of the pipe and an outlet 35 spaced from the inlet 34, e.g. disposed close to the elongated tip 12, for providing irrigation water to the soil 13.

The cross-section of the stake may stake many profiles, for example star-like.

FIGS. 2A and 2B explain the stake 10 usage. With reference to FIG. 2A, the first end portion 26 of the pipe is inserted into the recess 16, in axial direction. The first end portion 26, passes under the bridges 22 until abutment against inlet 34, whereby it is retained within distal recess 17. Thus, the irrigation pipe 20 may be fixed in a vertical position with respect to the soil surface.

With reference to FIG. 2B, after fixing the first end portion 26 of the pipe in the distal recess portion 17, the second portion 27 of the pipe may be manually removed from the proximal recess portion 19, bent at the merger area 25, then squeezed into the lateral recess 18, being retained in this orientation by the overhanging element 28, without removing the first end portion 26 from its location at the end of the distal recess portion 17. After releasing the pipe, the second portion 27 thereof will tend to straighten and so will be biased to the upper side of the lateral recess 18, under the overhanging element 28. This will prevent the pipe from accidentally slipping out of the lateral recess 18. Thus, the irrigation pipe may be fixed in an angled or vertical position with respect to the soil. The rounded transition wall 32 ensures that the pipe turns smoothly, without forming a bending fold.

In this case, the axis X of the elongated recess 16 and the axis X' of the lateral recess 18 lie in one plane. The turn angle α may be practically from 30-120°. Alternatively, another lateral recess may be formed at the other side of the head 14, at a different angle α to the axis of the elongated recess 16.

The stake is manufactured as an integral body, i.e. without movable parts, for example from plastic material by injection moulding or any other suitable method.

It will be appreciated that the stake of the present invention may be implemented in many different ways. For example, retaining means such as clips or a labyrinth may be used instead of the elongated recess 16 with the bridges 22 or instead of the lateral recess 18 with the overhanging element 28.

The stake 10 may be assembled with the pipe 20 to form a stake assembly, and packaged as an assembled item. When packaged the second portion 27 of the pipe 20 may being in its first position.

The novel stake provides fixing of the irrigation pipe at a selectable angle, in vertical or angled position, by a simple and handy means, without the risk of folding and clogging the pipe. It is a simple product which may be manufactured in mass quantities by industrial methods.

The invention claimed is:

1. A stake for holding a pipe having a first end portion and a second portion bendable relative to the first end portion; the stake having at one end thereof a tip adapted for being driven into the soil, at the other end thereof a head for retaining said pipe, and the stake has a channel with an inlet adapted to receive water from the pipe and an outlet facing the tip, the head comprising a distal retaining portion for holding the first portion of the pipe, a first proximal retaining portion in the head, adapted for accommodating the second portion of the pipe in a first position coaxial with the first portion of the pipe when held in the distal retaining portion, and the head further comprises a second proximal retaining portion adapted for optionally accommodating the second portion of the pipe in its second position in which the pipe is bent, the first and second proximal retaining portions meeting at a transition region such that the change between the first and second position of the second portion of the pipe relative to the first portion of the pipe is achievable without removing said first portion from the distal retaining portion.

2. The stake according to claim 1, wherein said pipe is bendable at an area of merger between the first and second portions thereof, and said transition region is so formed as to smoothly accommodate the pipe at said area of merger, when the pipe is in its second position.

3. The stake according to claim 1, wherein said distal retaining portion includes at least one inward protruding element adapted to tightly retain said first portion of the pipe.

4. The stake according to claim 1, wherein the first and second proximal retaining portions are in the form of respective first and second proximal recesses extending along respective first and second axes oriented relative to each other at an angle corresponding to that between the first and second positions of the second portion of the pipe.

5. The stake according to claim 4, wherein said first and second axes lie in one plane.

6. The stake according to claim 4, wherein said recesses have sides open in one direction perpendicular to each of said first and second axes.

7. The stake according to claim 4, wherein said stake has an elongated shape and a main axis, and said distal retaining portion and first proximal recess are portions of one elongated recess extending along said main axis.

8. The stake according to claim 6, wherein said second proximal recess has an element overhanging an open side thereof, such that said second portion of the pipe may be inserted into said second proximal recess under said overhanging element or removed from said second proximal recess only by elastic bending of said pipe at said area of merger, the bending being achievable without removing said first end portion of pipe from said distal retaining portion of the stake.

9. The stake according to claim 4, wherein said angle is in the range of 30-120°.

10. The stake according to claim 1, having at least one additional proximal retaining portion similar to said second proximal retaining portion, providing holding said second portion of the pipe in said stake at a position different from said first and second positions thereof relative to the first portion of the pipe when held in the distal retaining portion.

11. The stake according to claim 1, wherein said stake is an integral body free of movable parts.

12. The stake according to claim 1, wherein said stake is made of polymer material.

13. The stake according to claim 1, wherein said stake is capable of preassembly with said pipe for packaging with the second portion of the pipe being in said first position.

14. An stake assembly comprising a stake according to claim 1 and a pipe comprising a first end portion and a second portion bendable relative to the first end portion, the first end portion of the pipe being held by the distal retaining portion of the stake and the second portion of the pipe being movable between the first and second positions thereof.

15. A package including the stake assembly as defined in claim 14, with the second portion of the pipe being in its first position.

* * * * *